W. L. BOOTH.
Running-Gear for Wagons.

No. 154,369. Patented Aug. 25, 1874.

WITNESSES:
E. Wolff
O. Sedgwick

INVENTOR:
W. L. Booth
BY
Munn & Co.
ATTORNEYS.

UNITED STATES PATENT OFFICE.

WILLIAM L. BOOTH, OF CONCORD STATION, PENNSYLVANIA.

IMPROVEMENT IN RUNNING-GEARS FOR WAGONS.

Specification forming part of Letters Patent No. 154,369, dated August 25, 1874; application filed May 29, 1874.

*To all whom it may concern:*

Figure 1:
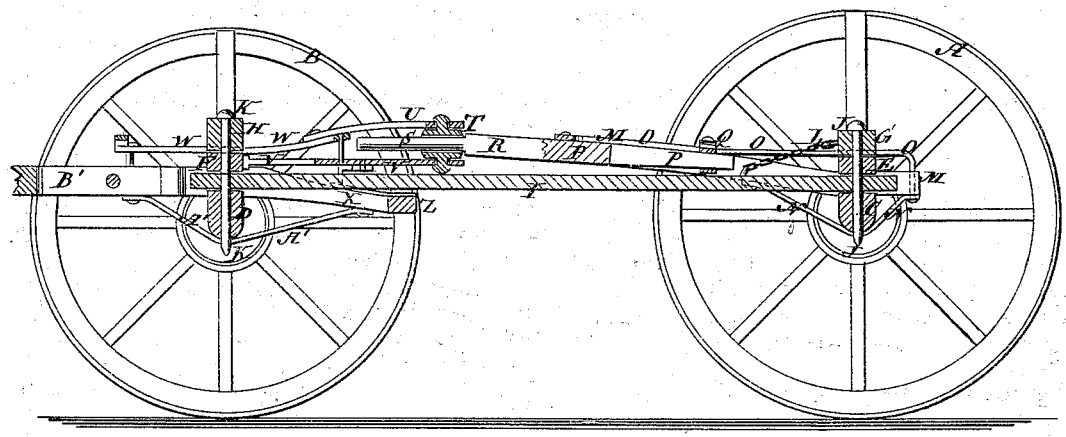
Figure 2:
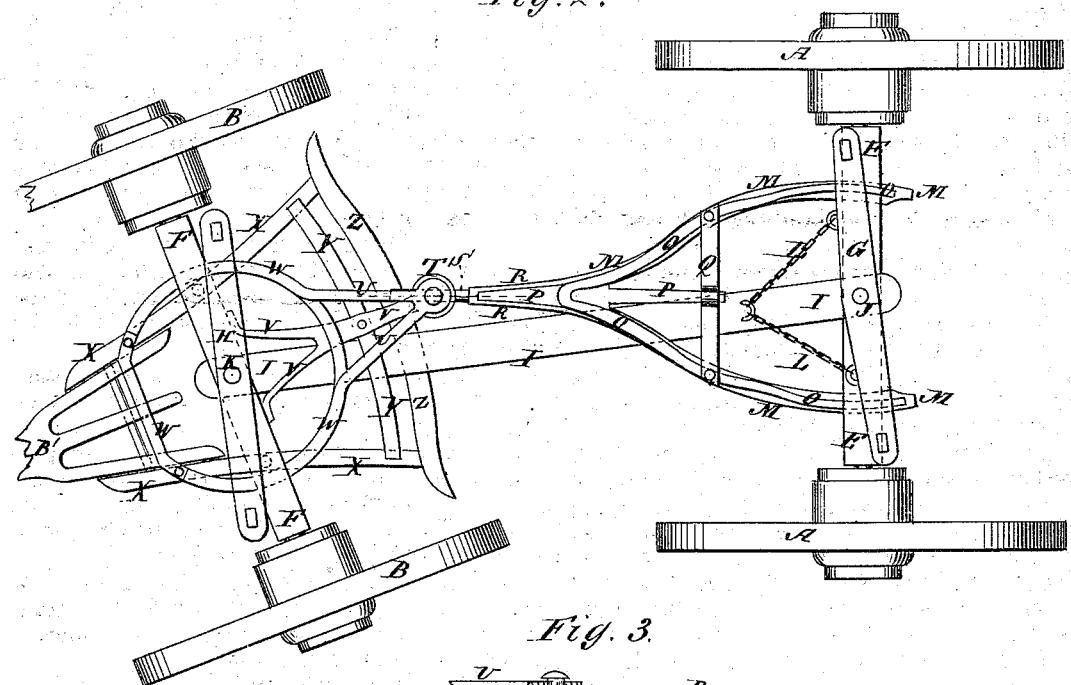
Figure 3:
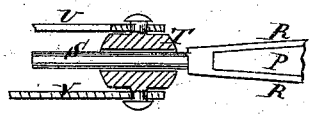

Be it known that I, WILLIAM L. BOOTH, of Concord Station, in the county of Erie and State of Pennsylvania, have invented a new and useful Improvement in Gearing for Wagons, Sleighs, &c., of which the following is a specification:

Figure 1 is a vertical longitudinal section of a wagon-gearing to which my improvement has been applied. Fig. 2 is a top view of the same. Fig. 3 is a detail section of the swiveled connection, enlarged.

Similar letters of reference indicate corresponding parts.

The invention will first be fully described, and then pointed out in the claims.

A are the rear wheels, and B are the forward wheels, of a wagon. C is the rear axle, and D is the forward axle. E is the rear sand-board, and F is the forward sand-board. G is the rear bolster, H is the forward bolster, and I is the main or long reach. The rear bolster G, and the rear end of the reach I, are pivoted to the rear sand-board E and the rear axle C by a king-bolt, J. The forward bolster H and the forward end of the reach I are pivoted to the forward sand-board F and the forward axle D by a king-bolt, K. The pivoted rear bolster is connected with the reach I by two chains or rods, L, so as to be always held at right angles with said reach. M are the rear hounds, the rear ends of which project in the rear of the axle C and sand-board E, to which they are secured, to receive the rear ends of the braces N and O. The braces N pass beneath, and are secured to, the axle C, and their forward ends are secured to the lower side of the middle part of the said hounds M. The upper braces O pass over the sand-board E, and along the upper side of the hounds M, to also serve as a facing for said hounds. The friction between the bolster G and the braces O may be diminished by rollers connected with said bolster, if desired. To and between the forward ends of the rear hounds M is secured the short reach P, the rear ends of which extend to within about a foot of the rear axle C, and is secured to the middle part of a cross-bar, Q, the ends of which are attached to the hounds M. To the sides of the forward end of the short reach P are secured two iron straps, R, the forward ends of which project a little beyond the forward end of the short reach P, and to and between them is welded the rear end of the round iron rod S, which passes through, and works in, a hole through the ball T. The ball T has gudgeons formed upon its upper and lower sides at right angles to the hole through said ball, which gudgeons work in holes in the rear ends of the iron bars U V, so as to swivel said ball in place. The upper bar, U, is made V-shaped, and the ends of its arms are riveted or otherwise secured to the circle or fifth-wheel W, which is secured to the forward sand-board F, and its forward part is connected with the forward hounds X. The lower bar, V, is secured to the upper sway-bar, Y, and its forward part is branched, and is attached to the sand-board F. The rear ends of the forward hounds are connected by the lower sway-bar, Z, between which and the upper sway-bar, Y, also attached to the said hounds, the reach I passes. The connection between the hounds X and the forward axle D is strengthened by the brace-straps A', which pass beneath said forward axle, and the end parts of which are attached to said hounds X. With the forward parts of the hounds X is connected the tongue B' in the ordinary way.

Having thus described my invention, I claim as new and desire to secure by Letters Patent—

1. The combination, with rear axle, of pivoted reach I, pivoted rear bolster G, and chains L L, to allow the reach limited play on the axle, and preserving its relative position with respect to the bolster, as set forth.

2. The combination, with rear hounds M passing through axle, of braces N O passing, respectively, under axles and over sand-boards, as and for the purpose set forth.

3. The front fifth-wheel frame, provided with the swiveled perforated ball T, as and for the purpose specified.

4. The combination, with front axle and hounds, of the straps A' passing under axle, as and for the purpose described.

WILLIAM L. BOOTH.

Witnesses:
D. H. ALDER,
D. S. LYONS.